United States Patent [19]

Koga

[11] Patent Number: 5,109,285
[45] Date of Patent: Apr. 28, 1992

[54] TIME BASE CORRECTION CIRCUIT FOR A REPRODUCED VIDEO SIGNAL FROM A VIDEO TAPE RECORDER

[75] Inventor: Takashi Koga, Kanagawa, Japan
[73] Assignee: Kabushiki Kaisha Toshiba, Kanagawa, Japan
[21] Appl. No.: 372,006
[22] Filed: Jun. 27, 1989

[30] Foreign Application Priority Data

Jun. 30, 1988 [JP] Japan .............................. 63-163449

[51] Int. Cl.$^5$ .......................... H04N 5/94; H04N 5/95
[52] U.S. Cl. ................................... 358/337; 358/314; 358/320; 358/325; 358/336; 360/36.1
[58] Field of Search ............... 358/337, 319, 314, 336, 358/320, 325; 360/36.2, 36.1

[56] References Cited

U.S. PATENT DOCUMENTS

| | | | |
|---|---|---|---|
| 4,509,078 | 4/1985 | Kuroda | 358/314 |
| 4,542,417 | 9/1985 | Ohta | 358/337 |
| 4,623,940 | 11/1986 | Matsumoto et al. | 360/36.2 |

*Primary Examiner*—Roy N. Envall, Jr.
*Assistant Examiner*—Huy Nguyen
*Attorney, Agent, or Firm*—Finnegan, Henderson, Farabow, Garrett and Dunner

[57] ABSTRACT

In a video tape recorder and reproduction apparatus, a reproduction circuit includes a switcher for generating a composite video signal composed of a multiplicity of synchronization signals from two or more video heads, a synchronization signal separator for receiving the composite video signal and separating from the composite video signal the synchronization signal, an error detection circuit for receiving the synchronization signal, detecting an error in the synchronization signal from an average period of the synchronization signals, and outputting an error signal representative of the error, a hold circuit for receiving the error signal and generating a correction signal having a constant value for each average period of the synchronization signals, with a value of the correction signal being adjusted by being added with the error signal and holding the adjusted value for each successive period of the synchronization signals and a delay circuit for receiving the composite video signal and correcting the time base of the composite video signal in response to the correction signal.

29 Claims, 6 Drawing Sheets

TIME BASE CORRECTION CIRCUIT FOR A REPRODUCED VIDEO SIGNAL FROM A VIDEO TAPE RECORDER

FIELD OF THE INVENTION

The present invention relates generally to a video tape recorder, and more particularly, to a time base correction circuit for a reproduced video signal from a video tape recorder.

BACKGROUND OF THE INVENTION

In a video tape recorder (referred as to VTR hereinafter) of helical scan type, two heads are used for recording or reproducing video signals. Each of the two heads alternately traces a video tape for recording or reproducing a prescribed unit of the video signal (referred as to head signal hereinafter), e.g., one field of the video signal.

In the reproduction operation, these head signals reproduced by the two heads are combined one after the other, as is well known. Thus, a continuous reproduced video signal comprising the head signals is obtained.

In the reproduced video signal, however, the head signals obtained by the two heads are occasionally combined out of synchronozation. Thus, the reproduced video signal becomes discontinuous. When such a discontinuous video signal is displayed on a video screen, e.g. a CRT (Cathode Ray Tube), a skew occurs at that portion corresponding to the discontinuous video signal.

FIG. 1 is a graph for examplarily illustrating the occurrence of the skew. In FIG. 1, two head signals A and B read by two heads are discontinuously combined. The head signals A and B have a plurality of regular horizontal scanning line signals H, respectively. Each of the regular horizontal scanning line signals H has a predetermined standard horizontal period Th.s. For example, the standard horizontal period Th.s of the regular horizontal scanning line signal H is provided at 64 μs. (64/1,000 sec.) in the NTSC color television system.

An irregular horizontal scanning line signal He at a discontinuous coupling portion, however, has an irregular horizontal period Th.e different from the standard horizontal period Th.s. For example, the period Th.e of the irregular scanning line signal He becomes shorter than the standard horizontal period Th.s by a period Te, as shown in FIG. 1. The period Te represents the discrepancy of the irregular horizontal period Th.e from the standard horizontal period Th.s. In some cases the period Th.e of the irregular horizontal scanning line signal He at the discontinuous coupling portion becomes longer than the standard horizontal period Th.s, but this case is not shown in the drawing.

When the irregular horizontal scanning line signal He with a shortened or a lengthened period is displayed, the image corresponding to the discontinuous coupling portion warps. This phenomenon is known as the skew.

Generally, the head signals A and B reproduced by the two heads are combined during a vertical blanking period of the video signal. Thus, the skew does not occur on a visible area of the display at a normal speed reproduction. However, the skew occurs on the visible area of the display at special speed reproductions such as a high speed reproduction. This visible skew at special speed reproductions deteriorates the video image.

Generally, VTRs are provided with a suitable means for preventing the skew at the special speeds. FIG. 2 is a block diagram showing a conventional VTR time base correction circuit for reproduced video signals.

In FIG. 2, an input terminal 10 is provided for receiving a composite video signal Sa. The composite video signal Sa is supplied from a switcher (not shown) which combines two head signals A and B reproduced by two heads (not shown). The composite video signal Sa is applied to an output terminal 12 through a variable delay circuit 14. The variable delay circuit 14 comprises a delay device, such as a charge coupled device (referred as to CCD hereinafter) 16 and a first voltage controlled oscillator (referred as to first VCO hereinafter) 18. The first VCO 18 generates a delay control pulse Sb in response to an error signal Sc applied thereto. The error signal Sc will be described in detail later. The CCD 16 delays the composite video signal Sa by a delay time controlled in response to the frequency of the delay control pulse Sb.

The composite video signal Sa from the input terminal 10 is also applied to a sync signal separator 20. The sync signal separator 20 separates a composite sync signal Sd. The composite sync signal Sd from the sync signal separator 20 is applied to a horizontal sync separator 22. The horizontal sync separator 22 further separates a horizontal sync signal Se. The period, i.e., a so-called horizontal period Th of a specific one of the horizontal sync signals Se varies when a discontinuous coupling of the reproduced video signals occurs.

The horizontal sync signals Se are applied to an error detection circuit 24. The error detection circuit 24 has a typical phase looked loop (referred as to PLL hereinafter) configuration. That is, the error detection circuit 24 comprises a second VCO 26, a phase comparator 28 and a low pass filter (referred as to LPF hereinafter) 30. The second VCO 26 generates a reference signal Sf for a phase comparison. The frequency Ff of the reference signal Sf is controlled by a feedback signal Sg from the LPF 30. The feedback signal Sg will be described later.

The horizontal sync signals Se are applied to a first input terminal 28a of the comparator 28. On the other hand, the reference signal Sf from the second VCO 26 is applied to a second input terminal 28b of the comparator 28. The comparator 28 compares in frequency the horizontal sync signals Se with the reference signal Sf. Thus, the above-mentioned error signal Sc is output from an output terminal 28c of the comparator 28 when the specific horizontal sync signal corresponding to the discontinuous coupling of the reproduced video signals is applied to the comparator 28.

The error signal Sc is not only applied to the variable delay circuit 14, but also applied to the LPF 30. The LPF 30 outputs a DC component of the error signal Sc. The DC component of the error signal Sc corresponds to the above-mentioned feedback signal Sg. The frequency Ff of the reference signal Sf generated by the second VCO 26 is controlled by the feedback signal Sg, i.e., the error signal Sc. The PLL configuration of the error detection circuit 24 operates to lock and stabilize the frequency Ff of the reference signal Sf into an average frequency of the horizontal sync signal Se from the horizontal sync separator 22.

The horizontal sync signal Se is obtained from the composite video signal Ba. In the composite video signal Sa, the regular horizontal scanning line signal H having the standard horizontal period Th.s is far larger in number than the signals having an irregular horizontal period Th.e, e.g., Th.s−Te of the irregular horizontal scanning line signal He. Thus, it is assumed that the average frequency of the horizontal sync signal Se matches with a standard horizontal frequency Fh.s corresponding to the standard horizontal period Th.s.

When the irregular horizontal scanning line signal He having the irregular horizontal period Th.e, e.g., Th.s−Te is applied to the input terminal 10, the frequency Fe of the horizontal sync signal Se differs from the standard horizontal frequency Fh.s, i.e., the frequency Ff of the reference signal Sf. The frequency Ff is locked into the average frequency of the horizontal sync signal Se. The comparator outputs the error signal Sc. The error signal Sc has a frequency Fc corresponding to the difference between the frequency Fe of the horizontal sync signal Se and the frequency Ff of the reference signal Sf, i.e., the standard horizontal frequency Fh.s.

The error signal Sc output by the error detection circuit 24 is applied to the first VCO 18 of the variable delay circuit 14. The first VCO 18 generates the delay control signal Sb in response to the error signal Sc from the error detection circuit 24. The delay control signal Sb has a frequency Fb corresponding to the error signal Sc. The delay control signal Sb is applied to the CCD 16. The CCD 16 delays the composite video signal Sa by a delay time defined by the frequency Fb of the delay control signal Sb.

When an irregular horizontal scanning line signal He is introduced into the input terminal 10, the composite video signal Sa is delayed by the delay time. Thus, the irregular horizontal scanning line signal He extends on the time base axis in response to the delay time. As a result, the irregular horizontal period Th.e of the irregular horizontal scanning line signal He is corrected to the standard horizontal period Th.s.

FIG. 3 is a graph showing the frequency response characteristic of the error detection circuit 24. In FIG. 3, a dotted line graph Ra shows the characteristic of the LPF 30. A solid line graph Rb shows a characteristic of the PLL, i.e., the entire error detection circuit 24.

In such a PLL for time base correction circuits, a lag-lead filter is typically used as the LPF 30 for increasing stability of the PLL. The lag-lead filter can independently control the loop gain and damping factor of the PLL. The frequency response characteristic of the lag-lead filter has two singular points, i.e., a pole point Pp and a zero point Pz, as shown in FIG. 3. Frequencies corresponding to the pole point Pp and the zero point Pz will be referred to as a pole-frequency Fp and a zero-frequency Fz hereinafter.

When the composite video signal Sa with the irregular horizontal scanning line signal He appears on the input terminal 10 (see FIG. 2), the error signal Sc with the frequency Fc which is the difference between the frequency Fe of the horizontal sync signal Se and the frequency Ff of the reference signal Sf, i.e., the standard horizontal frequency Fh.s as described above, is applied to the lag-lead filter type LPF 30 from the comparator 28. If the frequency Fc of the error signal Sc is higher than the zero-frequency Fz, the LPF 30 smooths the error signal Sc. Thus, a feedback signal Sg with the DC component of the error signal Sc is output from the LPF 30.

The feedback signal Sg controls the second VCO 26 so that the frequency Ff of the reference signal Sf is locked into the average frequency of the horizontal sync signal Se from the horizontal sync separator 22, as described above. When the frequency Ff of the reference signal Sf is locked into the average frequency of the horizontal sync signal Se, the frequency Fc of the error signal Sc varies by following the fluctuation of the frequency Fe of the horizontal sync signal Se applied to the comparator 28.

Thus, the error signal Sc applied to the first VCO 18 of the variable delay circuit 14 carries an information regarding the discrepancy period Te (Te=Th.s−Th.e). The first VCO 18 generates the delay control signal Sb. Then the delay control signal Sb with a frequency Fb responding to the discrepancy period Te is applied to the CCD 16. The CCD 16 delays the composite video signal Sa so that the discrepancy period Te of the irregular horizontal scanning line signal He in the current composite video signal Sa is removed. As a result, a corrected composite video signal Sa.c is output from the variable delay circuit 14.

One problem with the above-mentioned system is that the frequency Fc of the error signal Sc is lower than the pole-frequency Fp, the second VCO 26 completely follows the fluctuation of the horizontal sync signal Se. In this case, the error signal Sc output from the error detection circuit 24 becomes almost zero. As the error signal of the almost zero varies little, a delay control signal Sb with a prescribed constant frequency is applied to the CCD 16 from the first VCO 18. Thus, the variable delay circuit 14 fails to correct the time base of the composite video signal Sa.

Generally, the frequency discrepancy of the irregular horizontal scanning line signal He is in a relatively low frequency range, from 60 Hz to 300 Hz. To comply with such a low frequency range, the zero-frequency Fz must be set at a frequency under the lowest frequency, e.g., 60 Hz of the frequency range. When the zero-frequency Fz of lag-lead filter type LPFs is set to such a low frequency, the pole-frequency Fp is also set to a relatively low frequency near the zero-frequency. When the zero-frequency Fz and the pole-frequency Fp are set to such low frequencies, the operation of the PLLs becomes unstable. This is another problem with above-mentioned system.

Accordingly, the conventional time base correction circuit, as shown in FIG. 2, is very unstable. That is, the PLL of the error detection circuit 24 of the conventional time base correction circuit cannot maintain the locked state when a relatively large skew has occurred or when the power source of the VTR has been turned ON.

The conventional time base correction circuit, as shown in FIG. 2, has another drawback as described below. The other drawback will be described in reference to FIG. 4. FIG. 4 is a waveform showing the error signal Sc output from the error detection circuit 24, i.e., the comparator 28 in the PLL. The waveform examplarily shows the error signal Sc, when horizontal scanning line signals are alternately lengthened and shortened by a period Te from a standard horizontal period Th.s. Such a discrepancy +Te or −Te of the horizontal period Th occurs at periodic discontinuous coupling portions of two reproduced video signals. The error signal Sc has a positive peak level +V and a negative peak level −V for the irregular horizontal scanning line signals with the lengthened and shortened horizontal periods, i.e., Th.s+Te and Th.s−Te. When the positive and negative peak levels +V and −V are applied to the first VCO 18 in the variable delay circuit 14, the first VCO 18 controls the CCD 16 so as to correct the time base of the composite video signal Sa.

However, the error signal Sc output from the error detection circuit 24 converges into an average level Vo which corresponds to the average frequency of the horizontal sync signal Se or the standard horizontal frequency Fh.s, immediately after the positive and negative peak levels +V and −V. Thus, the first VCO 18 can not maintain the time base correction for the entire composite video signal Sa.

SUMMARY OF THE INVENTION

It is, therefore, an object of the present invention to provide a time base correction circuit for a reproduced video signal from a VTR which can remove a skew from a video image.

Another object of the present invention is to provide a time base correction circuit for a reproduced video signal from a VTR which can entirely correct the time base of the reproduced video signal.

In order to achieve the above object, a time base correction circuit of reproduced video signal for a VTR according to one aspect of the present invention includes a switcher for generating a composite video signal composed of a multiplicity of synchronization signals from two or more video heads, a synchronization signal separator for receiving the composite video signal and separating from the composite video signal the synchronization signal, an error detection circuit for receiving the synchronization signal, detecting an error in the synchronization signal from an average period of the synchronization signals, and outputting an error signal representative of the error, a hold circuit for receiving the error signal and generating a correction signal having a constant value for each average period of the synchronization signals, with a value of the correction signal being adjusted by being added with the error signal and holding the adjusted value for each successive period of the synchronization signals and a delay circuit for receiving the composite video signal and correcting the time base of the composite video signal in response to the correction signal.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
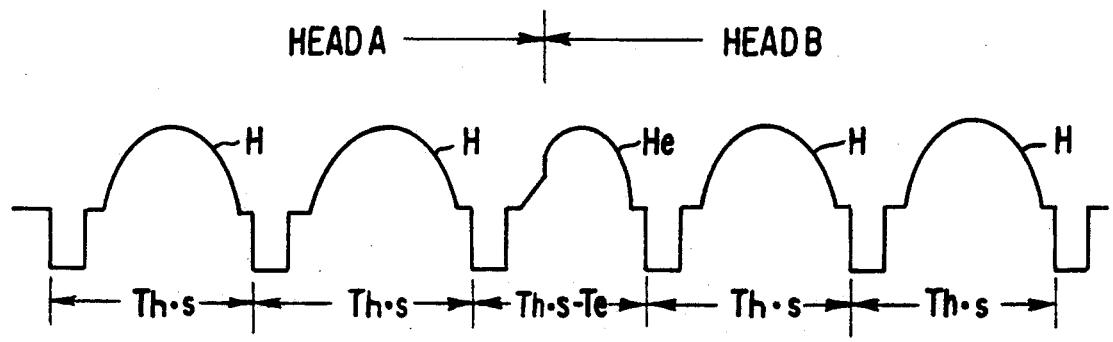
FIG. 1 is a graph for examplarily illustrating the occurrence of the skew.
Figure 2:
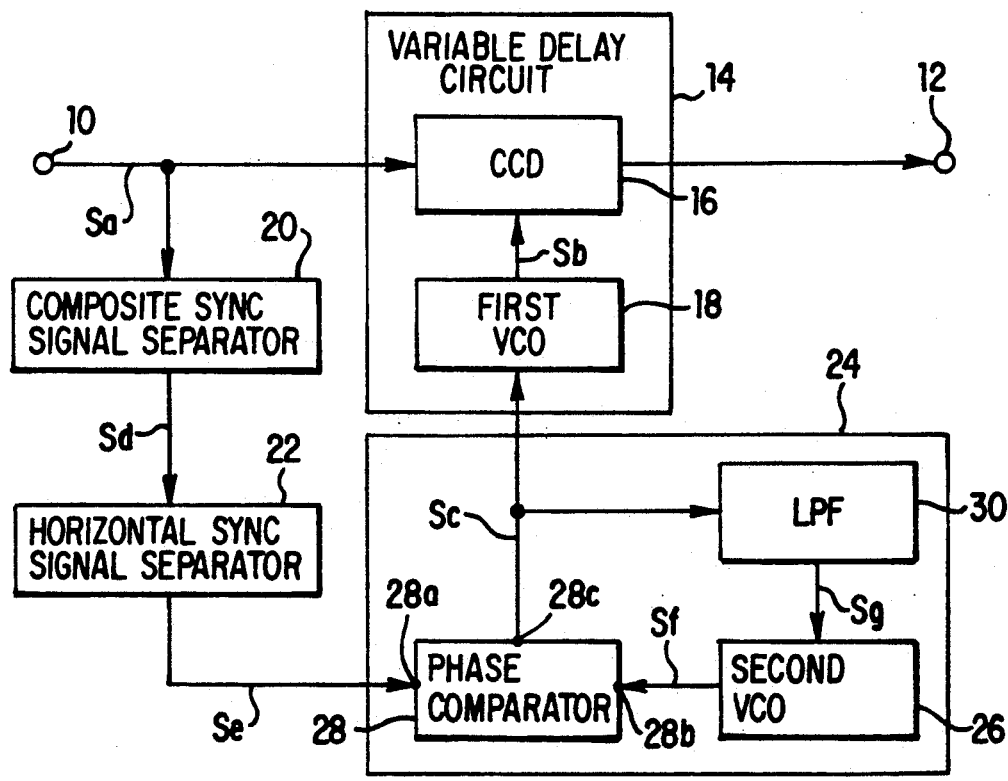
FIG. 2 is a block diagram showing a conventional time base correction circuit for a reproduced video signal from a VTR.
Figure 3:
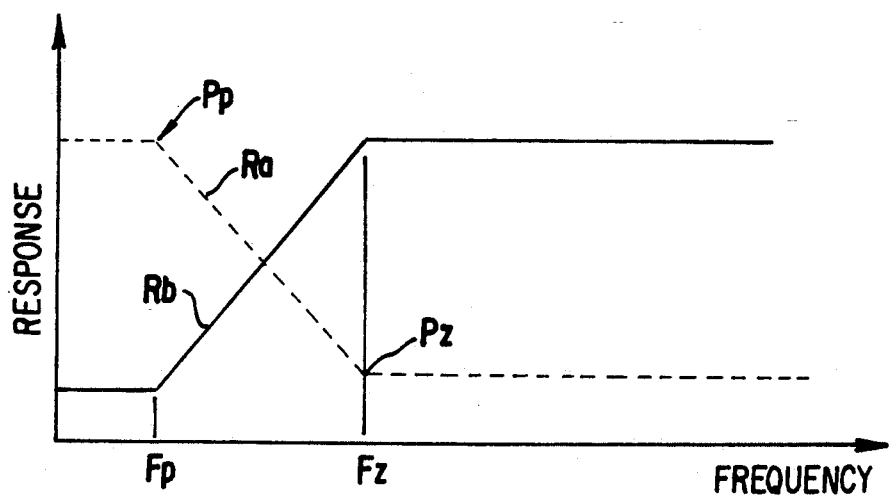
FIG. 3 is a graph showing a frequency response characteristic of the error detection circuit 24 of FIG. 2.
Figure 4:
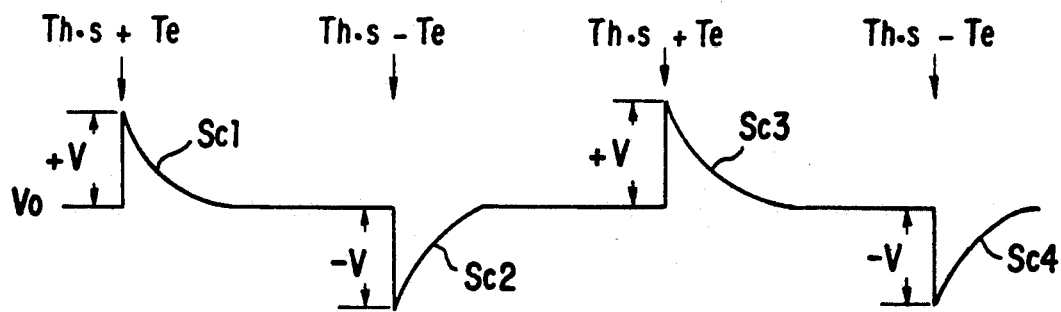
FIG. 4 is a waveform diagram showing the error signal Sc output from ,the error detection circuit 24 of FIG. 2.

The present invention will be described in detail with reference to FIGS. 5 through 11. Throughout the drawings, reference numerals or letters used in FIGS. 1 through 4 will be used to designate like or equivalent elements for simplicity of explanation.

Figure 5:
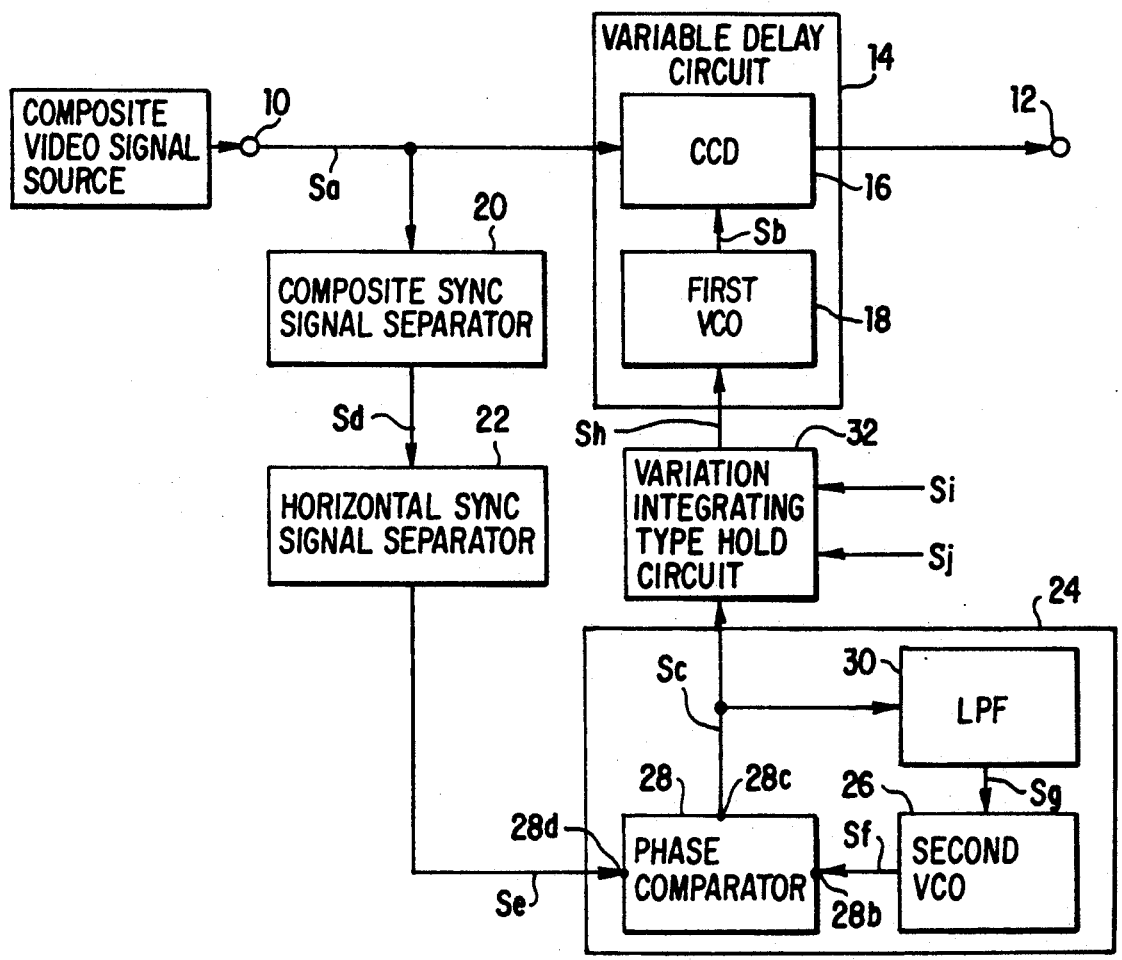
FIG. 5 is a block diagram showing a first embodiment of a time base correction circuit for a reproduced video signal from a VTR according to the present invention.
Figure 6:
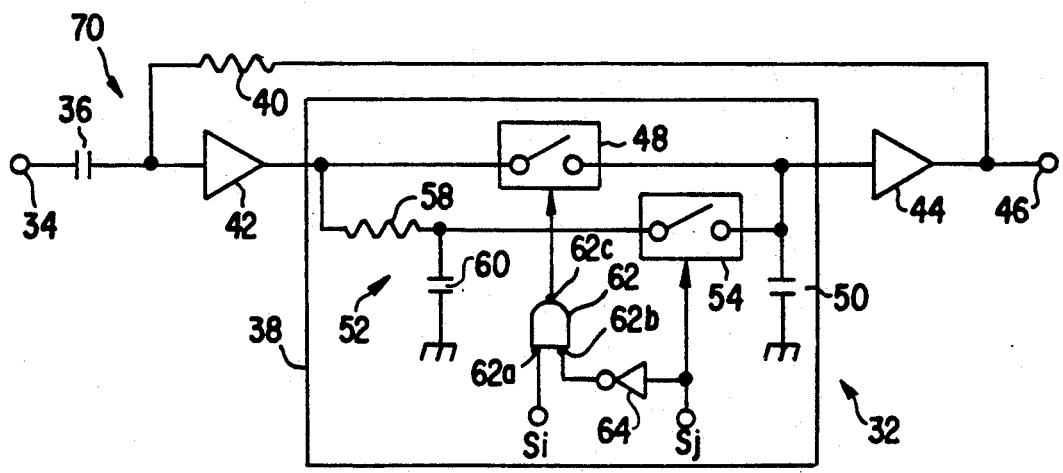
FIG. 6 is a block diagram showing in detail the variation integrating type hold circuit 32 of FIG. 5.
Figure 7:
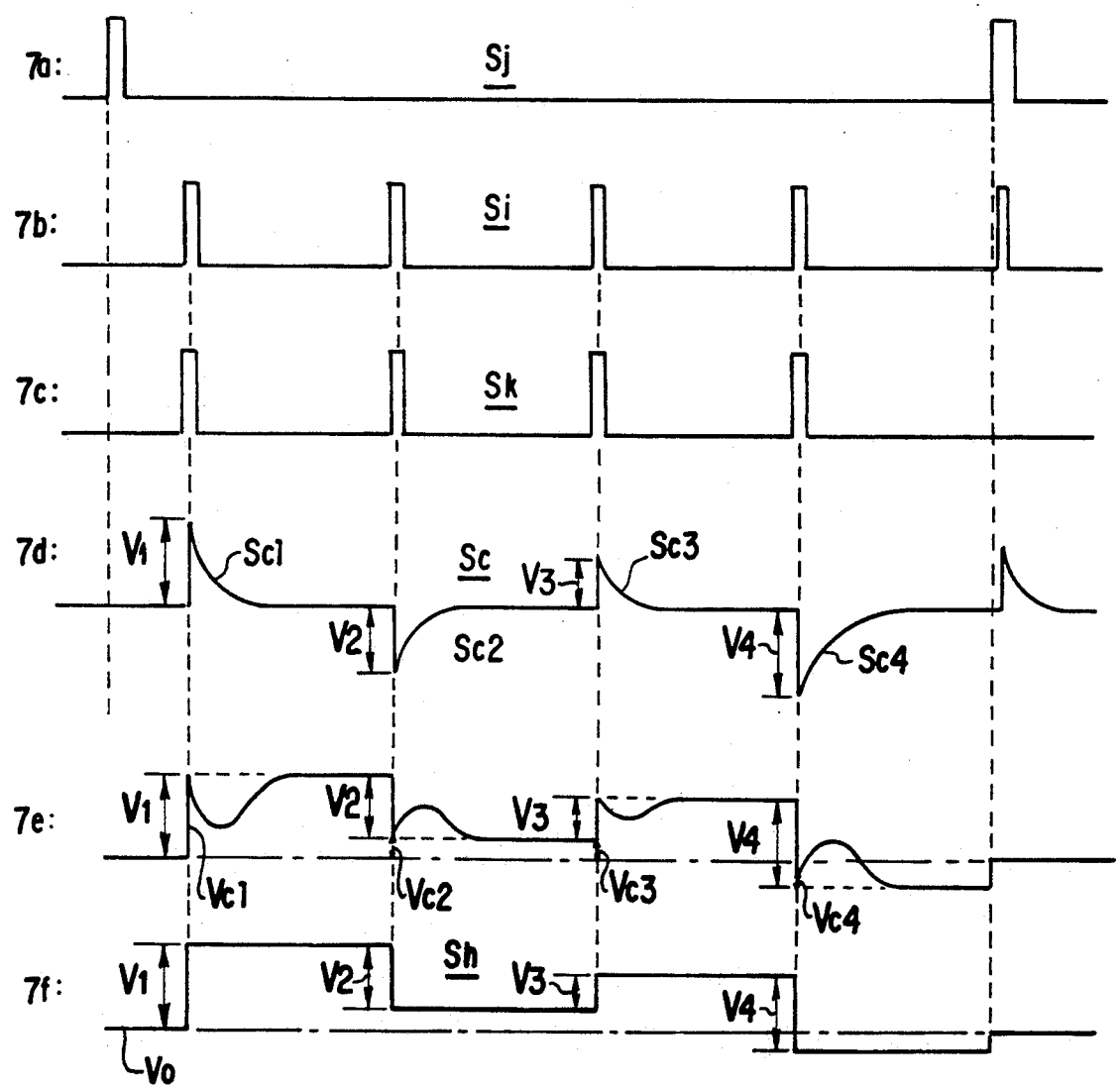
FIG. 7, consisting of a-f, is a timing chart showing the signals in the variation integrating type hold circuit 32 of FIG. 6.

Referring now to FIGS. 5 through 7, a first embodiment of the time base correction circuit for a reproduced video signal from a VTR according to the present invention will be described in detail.

In FIG. 5, an input terminal 10 is provided for receiving a composite video signal Sa. The composite video signal Sa is supplied from a switcher (not shown) which combines two head signals A and B reproduced by two heads (not shown). The composite video signal Sa is applied to an output terminal 12 through a variable delay circuit 14. The variable delay circuit 14 comprises a delay device, e.g., a CCD 16 and a first VCO 18. The first VCO 18 generates a delay control pulse Sb in response to a correction signal Sh applied thereto. The correction signal Sh will be described in detail later. The CCD 16 delays the composite video signal Sa by a delay time controlled in response to the frequency of the delay control pulse Sb.

The composite video signal Sa from the input terminal 10 is also applied to a sync signal separator 20. The sync signal separator 20 separates a composite sync signal Sd. The composite sync signal Sd from the sync signal separator 20 is applied to a horizontal sync separator 22. The horizontal sync separator 20 further separates a horizontal sync signal Se. The period, i.e., the horizontal period Th of a specific one of the horizontal sync signals Se varies when such a discontinuous coupling of the reproduced video signals occur at the time of the specific horizontal sync signal.

The horizontal sync signal Se is applied to an error detection circuit 24. The error detection circuit 24 has a typical PLL configuration similar to the one in the conventional time base correction circuit (see FIG. 2). Thus, the construction and the operation of the error detection circuit 24 will not be described here.

The error signal Sc obtained by the error detection circuit 24 is applied to a variation integrating type hold circuit 32. The variation integrating type hold circuit 32 generates the above-mentioned correction signal Sh in response to the error signal Sc.

The variation integrating type hold circuit 32 will be described in detail in reference to FIG. 6. As shown in FIG. 6, the variation integrating type hold circuit 32 comprises an input terminal 34, a coupling capacitor 36, a sample/hold circuit (referred as to S/H circuit hereinafter) 38, a feedback resistor 40, first and second buffers 42 and 44 and an output terminal 46.

The input terminal 34 is provided for receiving the error signal Sc output from the error detection circuit 24. The error signal Sc is applied to the S/H circuit 38 through the coupling capacitor 36 and the first buffer 42. An output of the S/H circuit 38 is given to the output terminal 46 through the second buffer 44 as the correction signal Sh. The correction signal Sh is fed back to the first buffer 42 from the output terminal 46 through the feedback resistor 40.

The S/H circuit 38 comprises a sampling switch 48, a hold capacitor 50, an integration circuit 52, a reset switch 54 and a switch control circuit 56. The integration circuit 52 is constructed in a typical integrator configuration by an integration resistor 58 and an integration capacitor 60. The switch control circuit 56 comprises an AND gate 62, an inverter 64, a set input terminal 66 and a reset input terminal 68. The set input terminal 66 is coupled to a first input terminal 62a of the AND gate 62. The reset input terminal 68 is coupled to a control terminal of the reset switch 54, as well as to a second input terminal 62b of the AND gate 62 through the inverter 64. An output terminal 62c of the AND gate 62 is coupled to a control terminal of the sampling switch 48.

Referring now to FIG. 7, the operation of the variation integrating type hold circuit 32 will be described in detail. The set input terminal 66 receives a skew detection signal Si. The skew detection signal Si includes a short pulse generated in synchronization with the timing of switching between two video heads. The waveform of the skew detection signal Si is shown by a graph 7b in FIG. 7. The reset input terminal 68 receives a prescribed reset signal Sj. For example, the reset signal Sj is provided once a certain prescribed number of vertical sync signals occur. The waveform of the reset signal Sj is shown by a graph 7a in FIG. 7.

The skew detection signal Si and the inverted signal of the reset signal Sj are applied to the AND gate 62. As a result, the AND gate 62 transmits a majority of the pulses of the skew detection signal Si therethrough. But the AND gate 62 prohibits transmission of the pulse of the skew detection signal Si when the reset signal Sj simultaneously occurs with the pulse of the skew detection signal Si. Thus, the AND gate 62 generates a sampling control Signal Sk, as shown by a graph 7c in FIG. 7. The sampling control signal Sk includes selected pulses of the skew detection signal Si. The sampling control signal Sk is applied to the control terminal of the sampling switch 48.

Thus, the error signal Sc applied to the S/H circuit 38 is sampled at the timing of the selected pulses of the skew detection signal Si. It is assumed that the error signal Sc varies as shown by a graph 7d in FIG. 7. The error signal Sc is divided into sections Sc1, Sc2, Sc3, Sc4, . . . having positive or negative peaks V1, V2, V3, V4 . . . . The positive peaks V1, V3, . . . and the negative peaks V2, V4, . . . alternately occur as described before. The timings of the positive and negative peaks V1, V2, V3, V4 . . . coincident with the pulses of the skew detection signal Si. Thus, selected positive and negative peaks V1, V2, V3, V4 are sampled by the sampling control signal Sk.

Now it is assumed that the first error signal section Sc1 is applied to the variation integrating type hold circuit 32. Then the first peak V1 (positive peak) is sampled by the sampling switch 48. The sampled level V1 is applied to the hold capacitor 50. Thus, the hold capacitor 50 holds the sampled level V1. The first sampled level V1 is given to the output terminal 46 through the second buffer 44. Then the first sampled level V1 is fed back to the first buffer 42 through the feedback resistor 40. For the signal thus fed back, the feedback resistor 40 and the coupling capacitor 36 constitute another integration circuit (referred as to second integration circuit hereinafter) 70. Thus, the first sampled level V1 is integrated by the second integration circuit 70.

The integrated signal of the feedback signal is mixed with the error signal So before the first buffer 42. Thus, a mixed signal Sm applied to the S/H circuit 38 varies as shown by a graph 7e in FIG. 7. As to the first peak V1, the mixed signal Sm converges into a first convergent level Vc1 the same as the first peak V1. Thus, the output level of the S/H circuit 38 is firstly held at a first output level the same as the first convergent level Vc1 or the first peak V1. The output level of the S/H circuit 38, i.e., the correction signal Sh obtained by the variation integrating type hold circuit 32 is shown by a graph 7f in FIG. 7.

Then the second error signal section Sc2 is applied to the variation integrating type hold circuit 32. The second error signal section Sc2 is added with the level V1 previously fed back to the first buffer 42. The second error signal section Sc2 has the negative peak V2. Thus, the mixed signal Sm is reduced by the second error signal section Sc2 from the previous level V1. As a result, the mixed signal Sm converges into a second convergent level Vc2 (Vc2=V1−V2). The second convergent level Vc2 is shown in the second section of the graph 7e. The mixed signal Sm is sampled by the S/H circuit 38. As a result, the output level of the S/H circuit 38 is held at a second output level the same as the second convergent level Vc2, as shown in the second section of the graph 7f. In the second output level Vc2 or V1−V2, a latter variation of level V2 is integrated on the former variation of level V1.

According to the similar manner, the convergent level Vc of the mixed signal Sm shifts to third, fourth, etc. convergent level Vc3 (Vc3=Vc2+V3), Vc4 (Vc4=Vc3−V4), etc., as shown by the graph 7e. Thus, the output level of the S/H circuit 38, i.e., the correction signal Sh obtained from the variation integrating type hold circuit 32, shifts to third, fourth, etc. output levels the same as the convergent levels Vc3, Vc4, etc., as shown by the graph 7f.

In the output levels Vc2 (Vc2=Vc1−V2), Vc3 (Vc3=Vc2+V3), Vc4 (Vc4=Vc3−V4) etc., the latter variation of level −V2, +V3, −V4 etc. is integrated on the former variation of level Vc1, Vc2, Vc3 etc. Further, the output levels Vc1, Vc2, Vc3, Vc4 etc., are held for each of the error signal sections Sc1, Sc2, Sc3, Sc4 etc. The output levels Vc1, Vc2, Vc3, Vc4 etc., are continuously applied to the first VCO 18 of the variable delay circuit 14. The frequency Fb of the delay control signal Sb is kept in frequencies corresponding to the levels Vc1, Vc2, Vc3, Vc4 etc., respectively. Thus, the delay time of the CCD 16 is held to times suitable to perform the time base correction of the composite video signals.

The time constant of the second integration circuit 70 is set to a value lower than the time constant corresponding to the above-mentioned zero-frequency Fz, so that the above-mentioned problem is avoided.

In the above embodiment, the gross sum of the positive peaks $+V1$, $+V3$, etc. and the other gross sum of the negative peaks $-V2$, $-V4$, etc. do not always cancel with each other. In an extreme case, the correction signal Sh may be saturated at some positive or negative value when the time base correction has been performed continuously for many times.

To prevent such a saturation of the correction signal Sh, the embodiment is provided with a reset circuit comprising the first integration circuit 52 and the reset switch 54. The reset circuit is coupled in parallel with the sampling switch 48 between the first buffer 42 and the hold capacitor 50. In the reset circuit, the first integration circuit 52 and the reset switch 54 are coupled in series. The control terminal of the reset switch 54 is coupled to the reset input terminal, as described before.

When a pulse of the reset signal Sj is applied to the reset input terminal 68, the reset switch 54 turns ON. On the other hand, the sampling switch 48 turns OFF since the AND gate 62 prohibits the transmission of the skew detection signal Si by the inversed signal of the reset signal Sj. The inversed signal of the reset signal Sj is obtained by the inverter 64, as described above. Thus, the mixed signal Sm is applied to first integration circuit 52 through the first buffer 42. Then the integrated signal of the mixed signal Sm is applied to the hold capacitor 50.

Thus, the hold capacitor 50 receives the integrated signal of the mixed signal Sm only for the period of the pulse of the reset signal Sj. The time constant of the first integration circuit 52 is set to a value larger than the period of the specific horizontal sync signal corresponding to the discontinuous coupling of the reproduced video signals. Then, the average level Vo which corresponds to the average frequency of the horizontal sync signal Se or the standard horizontal frequency Fh.s is held in the hold capacitor 50. Thus, the level of the correction signal Sh is reset into the average level Vo for every reset signal Sj. After the reset operation, the time base correction will be performed with a good response to the error signal Sc or the correction signal Sh.

The sampling switch 48 turns OFF during the reset operation, as described before. Thus, the time base correction is interrupted for the period. However, the reset operation can be set during a vertical blanking period of the composite video signal reproduced at a special speed such as the high speed reproduction. Thus, the skew occurring in the reset operation is shifted to the invisible area of the video screen.

Figure 8:
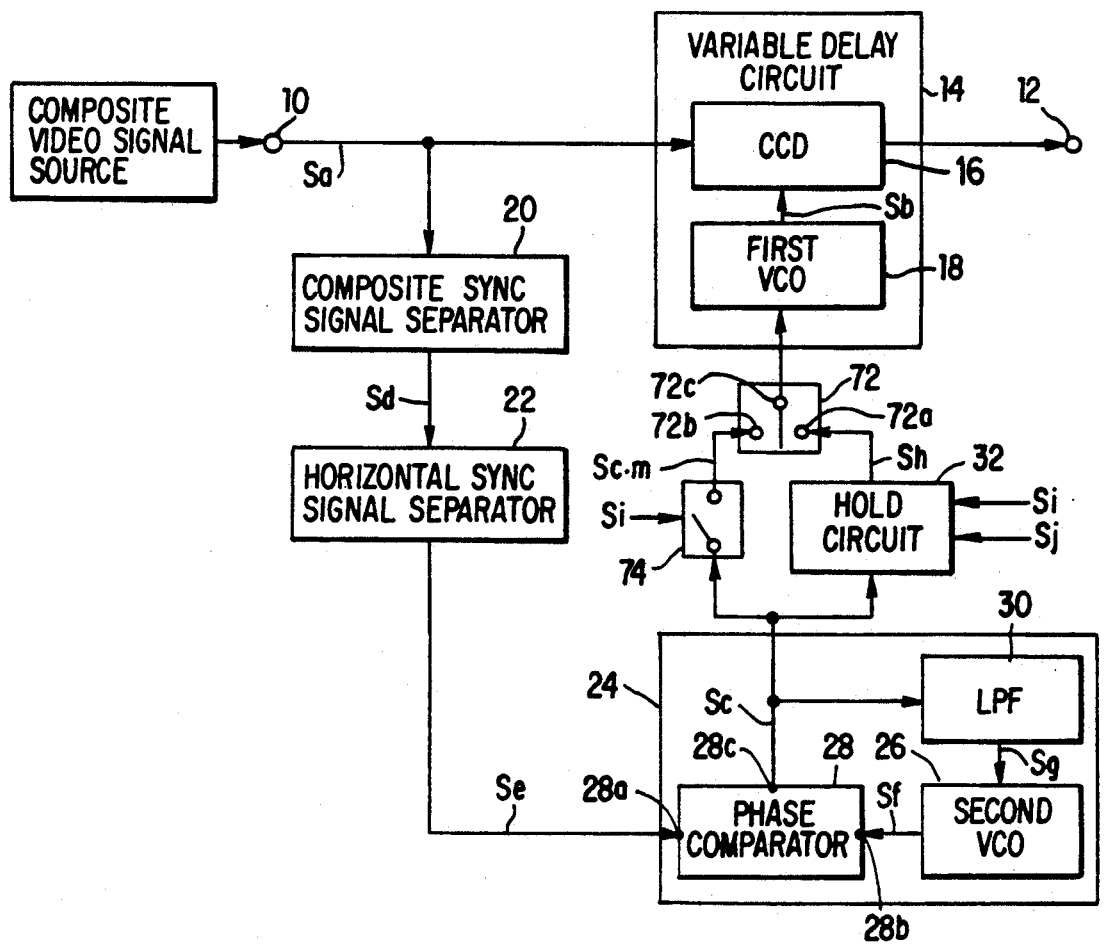
FIG. 8 is a block diagram showing a second embodiment of a time base correction circuit from a reproduced video signal from a VTR according to the present invention.
Figure 9:
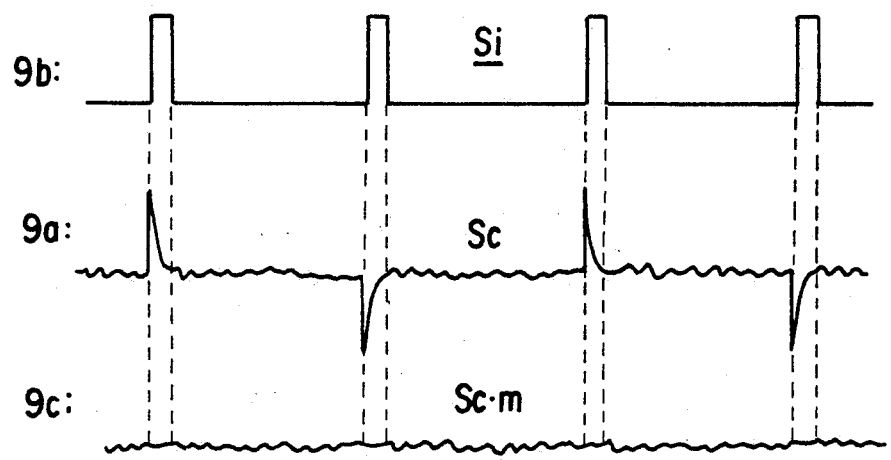
FIG. 9 is a timing chart showing the signals in the time base correction circuit of FIG. 8.

Referring now to FIGS. 8 and 9, a second embodiment of the time base correction circuit for VTRs according to an embodiment of the present invention will be described. As shown in FIG. 8, the second embodiment further comprises two switches, i.e., a sub switch 72 of a reproduction speed selector (not shown) and a bypass switch 74. The sub switch 72 is coupled between the variation integrating type hold circuit 32 and the variable delay circuit 14. The bypass switch 74 is coupled in parallel with the variation integrating type hold circuit 32 between the error detection circuit 24 and the sub switch 72. That is, the variation integrating type hold circuit 32 is coupled to one input terminal 72a of the sub switch 72 The bypass switch 74 is coupled to the other input terminal 72b of the sub switch 72. An output terminal 72c of the sub switch 72 is coupled to the control terminal of the first VCO 18 of the variation integrating type hold circuit 32.

The sub switch 72 is operated simultaneously with the operation of the reproduction speed selector. The reproduction speed selector is operated for selecting a desired speed reproduction mode between the normal speed reproduction mode and the high speed reproduction mode. When the high speed reproduction mode is selected, the output terminal 72c of the sub switch 72 is coupled to the first input terminal 72a. Thus, the correction signal Sh obtained by the variation integrating type hold circuit 32 is applied to the variation integrating type hold circuit 32 through the sub switch 72. On the other hand, the output terminal 72c of the sub switch 72 is coupled to the second input terminal 72b when the normal speed reproduction mode is selected. Thus, the error signal Sc obtained by the error detection circuit 24 is applied to the variation integrating type hold circuit 32 through the sub switch 72.

Referring now to FIG. 9, the operation of the second embodiment will be described. When the high speed reproduction mode is selected, the output terminal 72c of the sub switch 72 is coupled to the variation integrating type hold circuit 32 as described above. Thus, the correction signal Sh obtained by the variation integrating type hold circuit 32 is applied to the variable delay circuit 14 As a result, the time base correction circuit according to the second embodiment carries out the operation the same as the above-described embodiment, illustrated in FIG. 5.

When the normal speed reproduction mode is selected, the output terminal 72c of the sub switch 72 is coupled to the error detection circuit 24 through the bypass switch 74 as described above. Thus, the error signal Sc, as shown by graph 9a in FIG. 9, is applied to the sub switch 72. The bypass switch 74 is controlled by the skew detection signal Si, as shown by a graph 9b in FIG. 9.

The skew detection signal Si includes pulses which are in synchronous with the positive and negative peaks of the error signal Sc. These pulses of the skew detection signal Si turn OFF the bypass switch 74. The width of the pulses of the skew detection signal Si is set to almost cover the positive and negative peaks of the error signal Sc. Thus, the skew detection signal Si eliminates the the positive and negative peaks of the error signal Sc by the pulses. Thus, the bypass switch 74 outputs a modified error signal Sc.m, as shown by a graph 9c in FIG. 9.

In the normal speed reproduction mode, the error signal Sc, as shown by the graph 9a, causes the skew on the invisible area of the video screen, as described above. However, some disturbance of the picture due to the skew remains on the top portion of the video screen. According to the second embodiment, as shown in FIG. 8, the modified error signal Sc.m, as shown by the graph 9c, is applied to the variable delay circuit 14 instead of the error signal Sc. The modified error signal Sc.m includes many small variations of level, but does not include significant peaks. The small variations of level are caused by jitter. Therefore, the variable delay circuit 14 does not contribute the skew correction function, but it carries out a jitter correction, because the first VCO 18 and the CCD 16 operate to eliminate the jitter in the composite video signal Sa.

The correction signal Sh obtained by the variation integrating type hold circuit 32 is kept constant for every section corresponding to the field period (see the graph 7f in FIG. 7). Thus, the variable delay circuit 14 does not carry out the jitter correction in the high speed reproduction mode. But the variable delay circuit 14 carries out the jitter correction in the normal speed reproduction mode.

Figure 10:
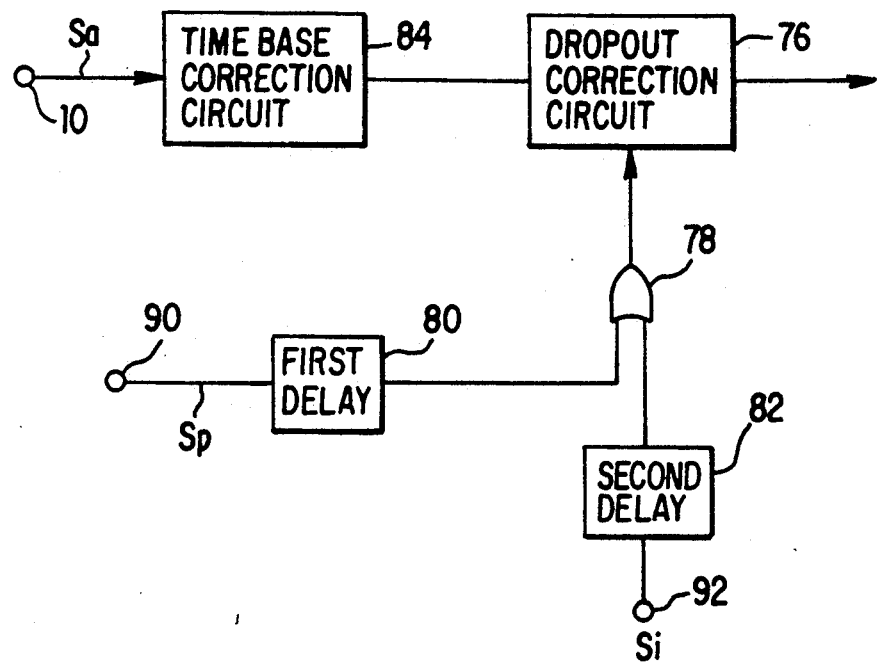
FIG. 10 is a block diagram showing a third embodiment of a time base correction circuit for a reproduced video signal from a VTR according to the present invention.
Figure 11:
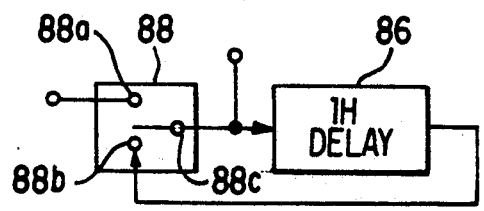
FIG. 11 is an illustration of the dropout correction circuit 76 of FIG. 10.
Figure 12:
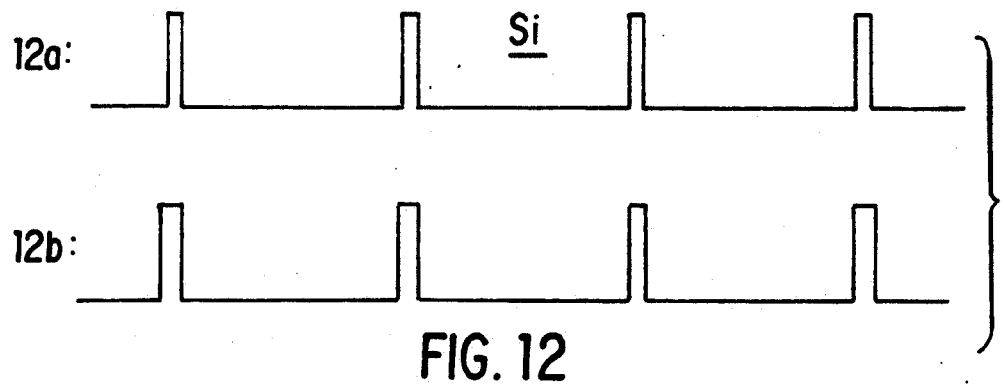
FIG. 12, consisting of a and b, is a timing chart showing the signals in the time base correction circuit of FIG. 10.

Referring now to FIGS. 10, 11 and 12, a third embodiment of the time base correction circuit for VTRs according to the present invention will be described. As shown in FIG. 10, the third embodiment further comprises a dropout correction circuit 76, an OR gate 78 and two delay circuits, i.e., a first and second delay circuits 80 and 82. The dropout correction circuit 76 follows a time base correction circuit 84. The time base correction circuit 84 corresponds to the entire circuit as shown in FIG. 5 or 8. That is, the time base correction circuit 84 outputs the composite video signal with the corrected time base.

The time base correction circuit 84, i.e., the CCD 16 in the variable delay circuit 14 (see FIG. 5) has a significant delay time. For example, a basic delay time or an average delay time of the CCD 16 is set to about 40 μs in a home-use VTR such as the VHS system VTR. The variable range of the delay time is set to about ±15 μs. Thus, the CCD 16, i.e., the time base correction circuit 84 has a variable delay time range of about 40±15 μs.

The time base correction circuit 84 operates when the skew occurs. Then, the time base correction circuit 84 not only corrects the time base of the composite video signal, but also delays the composite video signal by a significant delay time. In other words, the time base correction circuit 84 has a significant time lag at the start of its operation. Thus, the time base correction circuit 84 still outputs an uncorrected video signal during this significant time lag if a skew has occurred. As a result, an uncorrected video signal affected by the skew is output from the time base correction circuit 84.

The dropout correction circuit 76 comprises a one horizontal period delay circuit (referred as to 1H delay circuit hereinafter) 86 and a control switch 88, as shown in FIG. 11. A first input terminal 88a of the control switch 88 is directly coupled to the time base correction circuit 84. A second input terminal 88b of the control switch 88 is coupled to the output terminal of the 1H delay circuit 86. An output terminal 88c of the control switch 88 is coupled to both the output terminal 12 and the input terminal of the 1H delay circuit 86. A control terminal of the control switch 88 is coupled to the output terminal of the OR gate 78.

The first delay circuit 80 is coupled between a terminal 90 and the OR gate 78. The terminal 90 receives a conventional dropout detection signal Sp. The dropout detection signal Sp appears on the terminal 90 when a signal dropout occurs in the reproduced video signals. The dropout detection signal Sp is applied to the control switch 88 through the OR gate 78. Then, the output terminal 88c of the control switch 88 is coupled to the second input terminal 88b. The 1H delay circuit 86 delays the composite video signal by 1H period. Thus, the 1H delay circuit 86 outputs the former or earier signal of the composite video signal which was applied thereto 1H ago in response to the dropout detection signal Sp. The 1H former signal of the composite video signal is then applied to the output terminal 12 through the control switch 88. The 1H former signal of the composite video signal is a correctly reproduced signal. Thus, the dropout correction is carried out.

The second delay circuit 82 is coupled between another terminal 92 and the OR gate 78. The terminal 92 is provided for receiving the skew detection signal Si, as shown by a graph 12a in FIG. 12. The skew detection signal Si is delayed by the second delay circuit 82. Thus, the second delay circuit 82 outpus a delayed skew detection signal Si.d, as shown by a graph 12b in FIG. 12. The delayed skew detection signal Si.d is applied to the control switch 88 through the OR gate 78. Then, the output terminal 88c of the control switch 88 is coupled to the second input terminal 88b. The 1H delay circuit 86 delays the composite video signal by 1H period. Thus, the 1H delay circuit 86 outputs a former signal of the composite video signal which was applied thereto at 1H ago in response to the delayed skew detection signal Si.d. The 1H former signal of the composite video signal is a signal obtained before the occurrence of the skew. As a result, the dropout correction circuit 76 always outputs the composite video signal with correct time base.

As described above, the present invention can provide an extremely preferable time base correction circuit for VTRs.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is

1. In a video tape recorder and reproduction apparatus, a reproduction circuit comprising:
   means for generating a composite video signal composed of a multiplicity of synchronization signals from two or more video heads;
   means for receiving said composite video signal and separating from said composite video signal the synchronization signal;
   means for receiving said synchronization signal, detecting an error in said synchronization signal from an average period of said synchronization signals, and generating an error signal representative of said error;
   means for receiving said error signal and generating a correction signal having a constant value for each average period of said synchronization signals, with a value of said correction signal being adjusted by being added with said error signal and holding the adjusted value for each successive period of said synchronization signals, including
   capacitor means having a first terminal coupled to said error signal, and a second terminal, and
   resistor means having a first terminal coupled to the correction signal, and a second terminal coupled to the second terminal of the capacitor means; and delay means for receiving said composite video signal and correcting the time base of said composite video signal in response to said correction signal.

2. A video tape recorder and reproduction apparatus as in claim 1, wherein said means for receiving said composite video signal and separating the synchronization signal comprises a horizontal synchronization signal separating circuit for separating a horizontal synchronization signal from said opposite video signal.

3. A video tape recorder and reproduction apparatus as in claim 2, wherein said means for receiving said error signal and generating said correction signal further comprises a sample and hold circuit for keeping the value of said correction signal for each successive period of said horizontal synchronization signals, and a feedback circuit for adjusting the correction signal by adding with said error signal and holding the adjusted value for each successive period of said horizontal synchronization signal.

4. A video tape recorder and reproduction apparatus as in claim 3, wherein said means for receiving said error signal and generating a correction signal further comprises a reset circuit to reset the value of the correction signal to a prescribed value.

5. A video tape recorder and reproduction apparatus as in claim 1, further comprising first switch means for selecting either said error signal or said correction signal and providing the selected signal to said delay means.

6. A video tape recorder and reproduction apparatus as in claim 5, further comprising second switch means, coupled between said first switch means and said error signal, for eliminating positive and negative voltage peaks from said error signal.

7. A video tape recorder and reproduction apparatus as in claim 1, wherein the delay means includes a means for generating a corrected composite video signal, and the video tape recorder and reproduction apparatus further includes a second delay means for delaying said corrected composite video signal for a set period.

8. A method of correcting a synchronization signal error in a composite video signal composed of a multiplicity of said synchronization signals, comprising the steps of:
separating from said composite video signals said synchronization signal;
detecting an error in said synchronization signal and generating an error signal representative of said error for each average period of said synchronization signals;
generating a correction signal based upon said error signal wherein said correction signal is held at a constant value for each said period of said synchronization signals but is adjusted in value in response to said error signal for each successive period of said synchronization signals, including the substeps of
capacitively coupling a resistor to said error signal with a capacitor, and
charging the capacitor through the resistor by coupling the resistor to the correction signal; and
correcting the time base of said composite video signal in response to said correction signal.

9. A video tape recorder and reproduction apparatus as in claim 1, further including
a phase locked loop, having an output coupled to the means for receiving an error signal, including a low pass filter having a pole at a pole frequency and a zero at a zero frequency higher than the pole frequency, and wherein the combination of the resistor means and capacitor means has a time constant lower than the time constant corresponding to the zero frequency.

10. A video tape recorder and reproduction apparatus as in claim 4, wherein the reset circuit includes
a second resistor means having a first terminal coupled to the second terminal of the first resistor means, and a second terminal; and
a second capacitive means having a terminal coupled to the second terminal of the second resistor means.

11. A video tape recorder and reproduction apparatus as in claim 10, wherein the sample and hold circuit includes
a switch controlled by the horizontal synchronization signal, and wherein the combination of the second resistor means and second capacitor means has a time constant larger than the period of the horizontal synchronization signal.

12. A video tape recorder and reproduction apparatus as in claim 7, wherein the second delay means includes
horizontal delay means ,having an input for receiving an input signal and an output, for delaying the input signal for a interval corresponding to a period of the horizontal synchronization signal; and
switch means, having a movable contact coupled to the input of the horizontal delay means, a first fixed contact coupled to the output of the horizontal delay mans, a second fixed contact coupled to the delay means for receiving said composite video signal, and a control input.

13. A video tape recorder and reproduction apparatus as in claim 7, wherein the second delay means includes
horizontal delay means ,having an input for receiving an input signal and an output, for delaying the input signal for a interval corresponding to a period of the horizontal synchronization signal; and
switch means, having a movable contact coupled to the input of the horizontal delay means, a first fixed contact coupled to the output of the horizontal delay mans, a second fixed contact coupled to the delay means for receiving said composite video signal, and a control input; and
an OR gate having an output coupled to the control input, a first input coupled to a third delay means, and a second input coupled to a fourth delay means.

14. The video tape recorder and reproduction apparatus as in claim 7, wherein the second delay means includes
means for receiving a dropout detection signal and delaying said corrected composite video signal said set period in response to said dropout detection signal.

15. The video tape recorder and reproduction apparatus as in claim 7, wherein the second delay means includes
means for receiving a skew detection signal and delaying said corrected composite video signal for said set period in response to said skew detection signal.

16. A reproduction circuit, comprising:
means for receiving a composite video signal composed of a multiplicity of synchronization signals from two or more video heads and separating from said composite video signal the synchronization signal;

means for receiving said synchronization signal, detecting an error in said synchronization signal from an average period of said synchronization signals, and generating an error signal representative of said error;

means for receiving said error signal and generating a correction signal having a constant value for each average period of said synchronization signals, with a value of said correction signal being adjusted by being added with said error signal and holding the adjusted value for each successive period of said synchronization signals, including capacitor means having a first terminal coupled to said error signal, and a second terminal, and resistor means having a first terminal coupled tot he correction signal, and a second terminal coupled to the second terminal of the capacitor means; and delay means for receiving said composite video signal in correcting the time base of said composite video signal in response to said correction signal.

17. A circuit as in claim 16, wherein said means for receiving said composite video signal and separating the synchronization signal comprises a horizontal synchronization signal separating circuit for separating a horizontal synchronization signal from said composite video signal.

18. A circuit as in claim 17, wherein said means for receiving said errors signal and generating said correction signal further comprises a sample and hold circuit for keeping the value of said correction signal for each successive period of said horizontal synchronization signal, and a feedback circuit for adjusting said correction signal by adding with said error signal and holding the adjusted value for each successive period of said horizontal synchronization signal.

19. A circuit as in claim 18, wherein said means for receiving said error signal and generating a correction signal further comprises a reset circuit to reset the value of said correction signal to a prescribed value.

20. A circuit as in claim 16, further comprising first switch means for selecting either said error signal or said correction signal and providing the selected signal to said delay means.

21. A circuit as in claim 20, further comprising second switch means, coupled between said first switch means and said error signal, for eliminating positive and negative voltage peaks from said error signal.

22. A circuit as in claim 16, wherein the delay means includes a means for generating a corrected composite video signal, and the reproduction circuit further includes a second delay means for delaying said corrected composite video signal for a set period.

23. A circuit as in claim 16, further including a phase locked loop, having an output coupled to the means for receiving an error signal, including a low pass filter having a pole at a pole frequency and a zero at a zero frequency higher than the pole frequency, and wherein the combination of the resistor means and capacitor means has a time constant lower than the time constant corresponding to the zero frequency.

24. A circuit as in claim 19, wherein the reset circuit includes a second resistor means having a first terminal coupled to said second terminal of the first resistor means, and a second terminal; and a second capacitor means having a terminal coupled to said second terminal of the second resistor means.

25. A circuit as in claim 24, wherein the sample and hold circuit includes a switch controlled by said horizontal synchronization signal, and wherein the combination of said second resistor means and said second capacitor means has a time constant larger than the period of said horizontal synchronization signal.

26. A circuit as in claim 22, wherein the second delay means includes a horizontal delay means, having an input for receiving an input signal and an output, for delaying said input signal for a internal corresponding to a period of said horizontal synchronization signal; and switch means, having a movable contact coupled to said input of said horizontal delay means, a first fixed contact coupled to said output of said horizontal delay mans, a second fixed contact coupled to said delay means for receiving said composite video signal, and a control input.

27. A circuit as in claim 22, wherein the second delay means includes horizontal delay means, having an input for receiving an input signal and an output, for delaying said input signal for a internal corresponding to a period of said horizontal synchronization signal; and switch means, having a movable contact coupled to said input of said horizontal delay means, a first fixed contact coupled to said output of said horizontal delay mans, a second fixed contact coupled to said delay means for receiving said composite video signal, and a control input; and an OR gate having an output coupled to said control input, a first input coupled to a third delay means, and a second input coupled to a fourth delay means.

28. A circuit as in claim 22, wherein the second delay means includes means for receiving a dropout detection signal and delaying said corrected composite video signal for said set period in response to the dropout detection signal.

29. A circuit as in claim 22, wherein the second delay means includes means for receiving a skew detection signal and delaying said corrected composite video signal for said set period in response to the skew detection signal.

* * * * *

UNITED STATES PATENT AND TRADEMARK OFFICE
CERTIFICATE OF CORRECTION

PATENT NO. :  5,109,285
DATED      :  April 28, 1992
INVENTOR(S):  Takashi Koga

It is certified that error appears in the above-identified patent and that said Letters Patent is hereby corrected as shown below:

Claim 2, column 13, line 9, change "opposite"
    to --composite--.

Claim 8, column 13, line 45, change "signals"
    to --signal--.

Claim 10, column 14, line 11, change "capacitive"
    to --capacitor--.

Claim 12, column 14, line 25, before "interval"
    change "a" to --an--.

Claim 12, column 14, line 30, change "mans"
    to --means--.

Claim 13, column 14, line 37, before "interval"
    change "a" to --an--.

UNITED STATES PATENT AND TRADEMARK OFFICE
CERTIFICATE OF CORRECTION

PATENT NO. : 5,109,285
DATED : April 28, 1992
INVENTOR(S) : Takashi Koga

It is certified that error appears in the above-identified patent and that said Letters Patent is hereby corrected as shown below:

Claim 13, column 14, line 42, change "mans"
    to --means--.

Claim 16, column 15, line 15, change "tot he"
    to --to the--.

Claim 16, column 15, line 19, before "correcting"
    change "in" to --and--.

Claim 18, column 15, line 28, change "errors" to --error--.

Claim 26, column 16, line 20, before "horizontal"
    delete "a".

Claim 26, column 16, line 22, after "for" change
    "a" to --an--.

UNITED STATES PATENT AND TRADEMARK OFFICE
CERTIFICATE OF CORRECTION

PATENT NO. : 5,109,285
DATED : April 28, 1992
INVENTOR(S) : Takashi Koga

It is certified that error appears in the above-indentified patent and that said Letters Patent is hereby corrected as shown below:

Claim 26, column 16, line 22, change "internal"
to --interval--.

Claim 26, column 16, line 27, change "mans"
to --means--.

Claim 27, column 16, line 35, after "for" change "a"
to --an--.

Claim 27, column 16, line 35, change "internal"
to --interval--.

Claim 27, column 16, line 40, change "mans"
to --means--.

Signed and Sealed this

Fourteenth Day of December, 1993

Attest:

BRUCE LEHMAN

*Attesting Officer*     *Commissioner of Patents and Trademarks*